United States Patent
Seo et al.

(10) Patent No.: US 9,936,254 B2
(45) Date of Patent: *Apr. 3, 2018

(54) METHOD FOR PROVIDING PREVIOUS WATCH LIST OF CONTENTS PROVIDED BY DIFFERENT SOURCES, AND DISPLAY DEVICE WHICH PERFORMS SAME

(71) Applicant: LG ELECTRONICS INC., Seoul (KR)

(72) Inventors: Hyunkyung Seo, Seoul (KR); Suyeon Cho, Seoul (KR); Suzin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

This patent is subject to a terminal disclaimer.

(21) Appl. No.: 14/540,891

(22) Filed: Nov. 13, 2014

(65) Prior Publication Data
US 2015/0074604 A1  Mar. 12, 2015

Related U.S. Application Data

(63) Continuation of application No. 13/635,639, filed as application No. PCT/KR2011/002934 on Apr. 22, 2011.

(30) Foreign Application Priority Data

Apr. 22, 2010  (KR) .................. 10-2010-0037483

(51) Int. Cl.
*G06F 3/0482* (2013.01)
*H04N 21/462* (2011.01)
(Continued)

(52) U.S. Cl.
CPC ....... *H04N 21/4622* (2013.01); *G06F 3/0482* (2013.01); *G06F 3/04842* (2013.01);
(Continued)

(58) Field of Classification Search
CPC .......... H04N 21/4622; H04N 21/4332; H04N 21/440272; H04N 21/44204;
(Continued)

(56) References Cited

U.S. PATENT DOCUMENTS 7,065,287 B1 * 6/2006 Heredia ................. G11B 19/02
                                                      348/E5.002
7,689,510 B2 * 3/2010 Lamkin ............. G06F 17/30041
                                                      705/51
(Continued)

FOREIGN PATENT DOCUMENTS

CN          1486568 A        3/2004
CN          101507270 A      8/2009
(Continued)

*Primary Examiner* — Nathan Flynn
*Assistant Examiner* — Tung T Trinh
(74) *Attorney, Agent, or Firm* — Birch, Stewart, Kolasch & Birch, LLP

(57) ABSTRACT

A display device and a method of providing a contents list are provided. An apparatus/method is provided. The method includes: playing contents; determining whether the contents are played over a predetermined time; when the contents are played over the predetermined time, storing information on the contents in a previously-viewed-contents list; and once a request signal for displaying the previously-viewed-contents list occurs, displaying the previously-viewed-contents list.

21 Claims, 14 Drawing Sheets

(51) Int. Cl.
*H04N 21/442* (2011.01)
*H04N 21/45* (2011.01)
*G06F 3/0484* (2013.01)
*H04N 21/433* (2011.01)
*H04N 21/4402* (2011.01)
*H04N 21/482* (2011.01)

(52) U.S. Cl.
CPC ... *H04N 21/4332* (2013.01); *H04N 21/44204* (2013.01); *H04N 21/44222* (2013.01); *H04N 21/440272* (2013.01); *H04N 21/4532* (2013.01); *H04N 21/4826* (2013.01)

(58) Field of Classification Search
CPC ......... H04N 21/44222; H04N 21/4532; H04N 21/4826; G06F 3/0482; G06F 3/4842
USPC ....................................... 725/14, 46
See application file for complete search history.

(56) References Cited

U.S. PATENT DOCUMENTS

| | | | |
|---|---|---|---|
| 8,250,614 B1 | 8/2012 | Ellis et al. | |
| 2002/0120943 A1 | 8/2002 | Seto et al. | |
| 2003/0018972 A1* | 1/2003 | Arora | H04H 60/65 725/47 |
| 2003/0154473 A1 | 8/2003 | Shin | |
| 2003/0154478 A1* | 8/2003 | Hassell | H04N 5/44543 725/39 |
| 2004/0028375 A1* | 2/2004 | Kim | G11B 19/025 386/230 |
| 2005/0251825 A1 | 11/2005 | Fukuda et al. | |
| 2006/0064716 A1 | 3/2006 | Sull et al. | |
| 2006/0150103 A1* | 7/2006 | Chicles | H04N 5/44543 715/725 |
| 2006/0212531 A1* | 9/2006 | Kikkawa | H04L 29/06027 709/217 |
| 2006/0224997 A1 | 10/2006 | Wong et al. | |
| 2006/0259926 A1* | 11/2006 | Scheelke | H04N 5/4401 725/48 |
| 2007/0058924 A1* | 3/2007 | Yeh | G11B 27/105 386/237 |
| 2007/0157220 A1 | 7/2007 | Cordray et al. | |
| 2007/0157248 A1* | 7/2007 | Ellis | H04N 5/445 725/47 |
| 2008/0065638 A1* | 3/2008 | Brodersen | G06F 3/0482 |
| 2008/0082921 A1 | 4/2008 | Negi | |
| 2008/0155614 A1 | 6/2008 | Cooper et al. | |
| 2008/0216002 A1* | 9/2008 | Morita | G06F 17/30056 715/764 |
| 2008/0235348 A1* | 9/2008 | Dasgupta | H04H 60/64 709/218 |
| 2009/0133063 A1* | 5/2009 | Sparrell | H04N 5/44543 725/40 |
| 2009/0178081 A1* | 7/2009 | Goldenberg | G06F 3/0482 725/46 |
| 2010/0031193 A1* | 2/2010 | Stark | G06F 17/30861 715/810 |
| 2010/0037179 A1* | 2/2010 | Ito | G06F 17/30274 715/838 |
| 2010/0086277 A1* | 4/2010 | Craner | H04N 5/76 386/278 |
| 2010/0238191 A1* | 9/2010 | Lee | G06K 9/00221 345/589 |
| 2011/0035774 A1 | 2/2011 | Parker | |
| 2011/0119621 A1* | 5/2011 | Cho | H04N 5/44591 715/788 |
| 2011/0119707 A1* | 5/2011 | Bae | H04N 21/4622 725/39 |
| 2011/0161242 A1 | 6/2011 | Chung et al. | |
| 2011/0162009 A1* | 6/2011 | Adimatyam | H04N 5/775 725/40 |
| 2011/0320020 A1* | 12/2011 | Price | G06F 17/30053 700/94 |

FOREIGN PATENT DOCUMENTS

| | | |
|---|---|---|
| EP | 1158795 A2 | 11/2001 |
| EP | 1577746 A2 | 9/2005 |
| EP | 2141919 A1 | 6/2010 |
| JP | 2004-531104 A | 10/2004 |
| JP | 2008-78997 A | 4/2008 |
| JP | 2008-85662 A | 4/2008 |
| JP | 2009-521757 A | 6/2009 |
| KR | 10-2007-0028253 A | 3/2007 |
| WO | WO 02/45430 A2 | 6/2002 |
| WO | WO 2007/026357 A2 | 3/2007 |

* cited by examiner

FIG.3
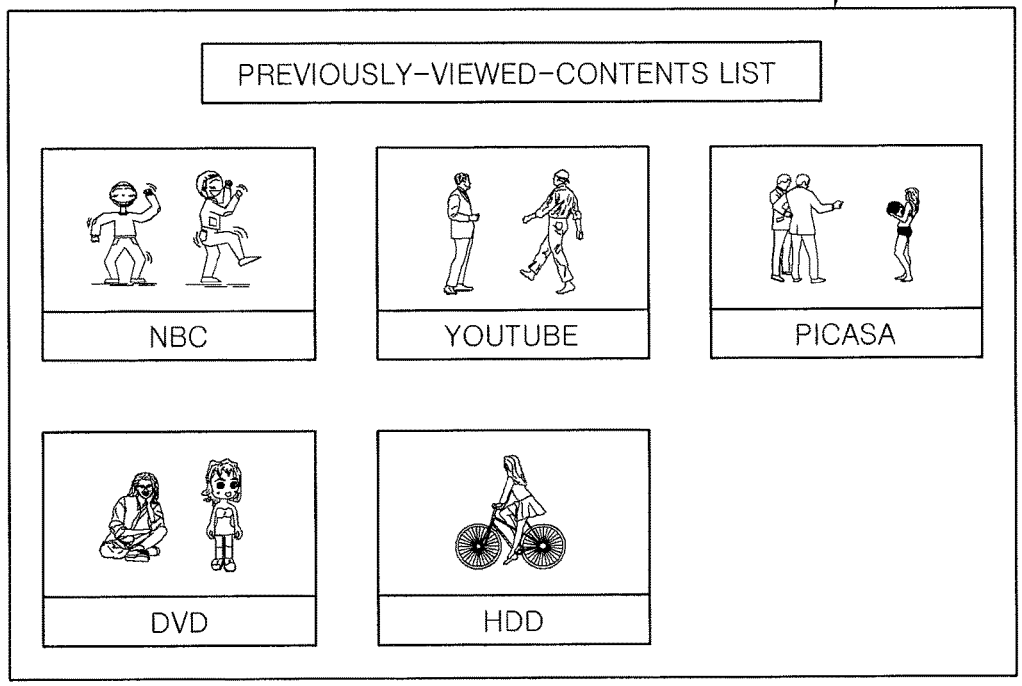
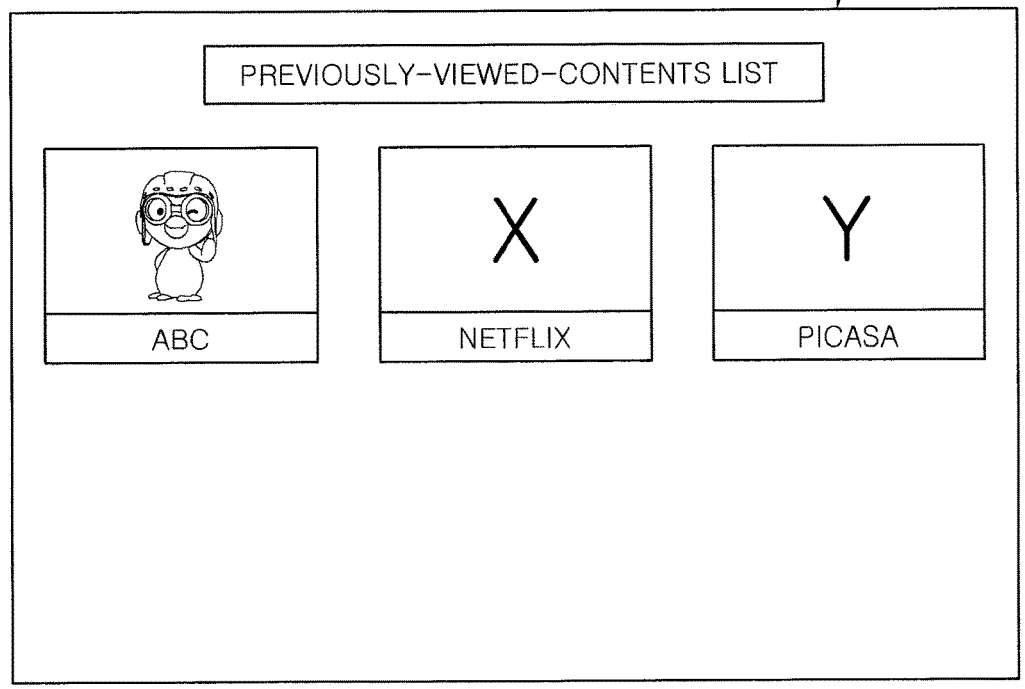

METHOD FOR PROVIDING PREVIOUS WATCH LIST OF CONTENTS PROVIDED BY DIFFERENT SOURCES, AND DISPLAY DEVICE WHICH PERFORMS SAME

CROSS-REFERENCE TO RELATED APPLICATIONS

This application is a Continuation Application of co-pending U.S. patent application Ser. No. 13/635,639 filed on Sep. 17, 2012, which is a National Phase of PCT/KR2011/002934 filed on Apr. 22, 2011, which claims priority under U.S.C. 119(a) to Patent Application No. 10-2010-0037483 filed in the Republic of Korea on Apr. 22, 2010, all of which are hereby expressly incorporated by reference into the present application.

BACKGROUND

The present disclosure relates to a display device and a method of controlling the same. In more detail, the present invention relates to a display device for providing contents provided from a plurality of different sources and a method of controlling the same, in which once content is played, a previously-viewed-contents list for the played content is generated and is provided according to user input. A user may easily check information on previously-viewed-contents through a previously-viewed-contents list provided from a plurality of sources and also may easily access them.

As digital TV technology is developed and commercialized based on a typical analog broadcast, various kinds of contents services such as real-time broadcasting, Contents On Demand (COD), games, and news are provided to users through an internet network connected to each home in addition to typical broadcast media.

An example of a contents service using the internet network may include Internet Protocol TV (IPTV). The IPTV transmits diverse information services, video contents, and broadcasting via a high-speed internet network in order to provide them to users' televisions.

Recently, concepts on broadband TV and web TV are introduced as a network TV type, which is developed one step further from such an IPTV. Unlike a typical IPTV, the broadband TV or web TV includes a plurality of contents providers, and a user accesses each contents provider to receive contents that the contents provider provides such as various VODs, games, and video call services.

SUMMARY

As contents that display devices supports become diversified, Embodiments provide a display device for providing information on previously accessed all contents so that a user may easily access preferred contents.

In one embodiment, a method of providing a contents list in a display device includes: playing contents; determining whether the contents are played over a predetermined time; when the contents are played over the predetermined time, storing information on the contents in a previously-viewed-contents list; and once a request signal for displaying the previously-viewed-contents list occurs, displaying the previously-viewed-contents list.

In another embodiment, a display device includes: a contents receiving unit for receiving contents provided from a plurality of sources; a contents processing unit for processing the received contents from the contents receiving unit into an output format; a display unit for displaying the contents processed by the contents processing unit; a control unit for storing contents information including source information displayed over a predetermined time and generating a previously-viewed-contents list including the at least one stored content; and a storage unit for storing contents information on the previously played contents and storing the generated previously-viewed-contents list.

The details of one or more embodiments are set forth in the accompanying drawings and the description below. Other features will be apparent from the description and drawings, and from the claims.

BRIEF DESCRIPTION OF THE DRAWINGS

FIG. 3 is a view illustrating a method of providing a list of contents previously viewed by each user in a display device according to an embodiment.

DETAILED DESCRIPTION OF THE EMBODIMENTS

The terms and words used in the specification and claims should not be interpreted as conventional or dictionary meanings, and thus, should be interpreted as meanings and concepts corresponding to the technical idea of the present invention, on the basis of the principle that the inventor may appropriately define the concept of the terms in the best way in order to describe his/her own invention.

Accordingly, the invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Figure 1:
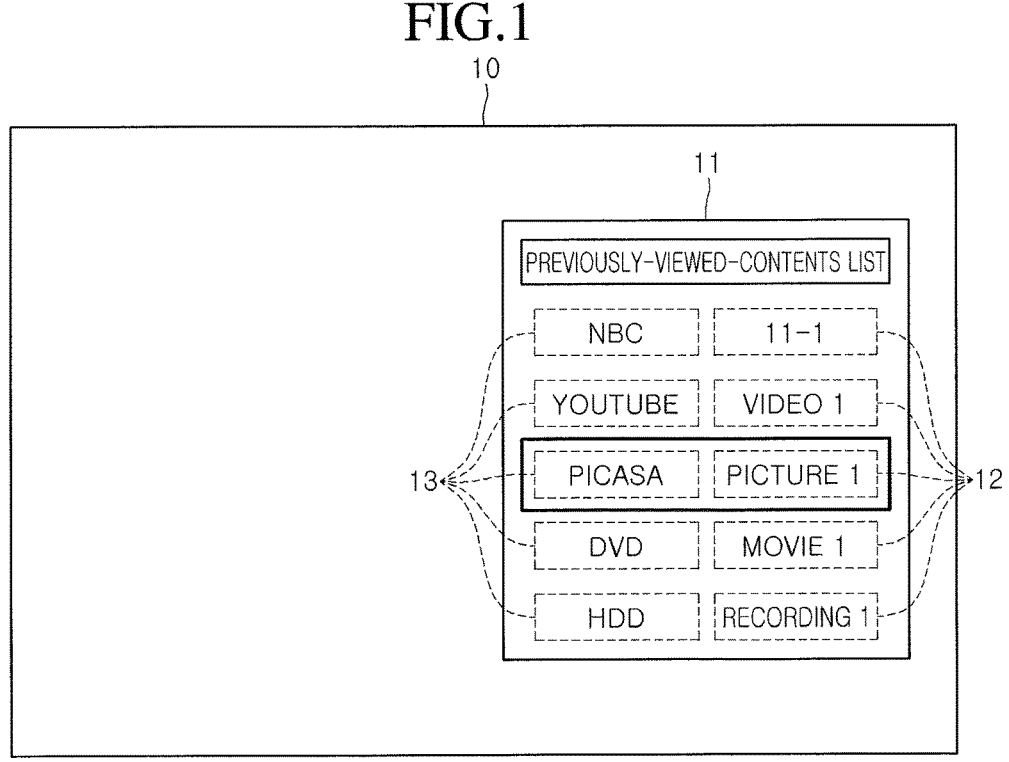
FIG. 1 is a view illustrating a list of contents previously viewed in a display device according to an embodiment.

FIG. 1 is a view illustrating a list of contents previously viewed in a display device 10 according to an embodiment.

As shown in FIG. 1, the display device 10 provides information on contents that a user previously viewed according to an embodiment. The information on previously-viewed-contents may be provided as a previously-viewed-contents list 11. The previously-viewed-contents list 11 may include contents information 12, and also include a contents source 13 according to an embodiment.

The display device 10 may display contents provided from various sources as described later. For example, the contents may include contents provided through terrestrial broadcasting, contents provided from contents providers through a network, contents stored in storage media such as HDD, optical disk, and USB, which are fixed or detachable to the display device 10, and contents provided through an external device such as a DVD player.

In FIG. 1, NBC is an example of a terrestrial broadcasting station. YOUTUBE and PICASA are examples of a contents provider that provides contents through a network. HDD is an example of a storage media connected to the display device 10. DVD is an example of an external device. Additionally, '11-1', video 1, picture 1, movie 1, recording 1 are examples of contents information. When the source is terrestrial broadcasting, a channel number may be displayed with '11-1', and if the source is another one, a contents title may be displayed with '11-1'.

The previously-viewed-contents list shown in FIG. 1 may be displayed through user's menu manipulation. Also, when a user turns on the display device 10, the previously-viewed-contents list may be displayed as an initial screen. Additionally, if the display device 10 is a smart TV, a user may edit a main screen, and thus may set the previously-viewed-contents list of FIG. 1 to be included in the main screen.

Figure 2:
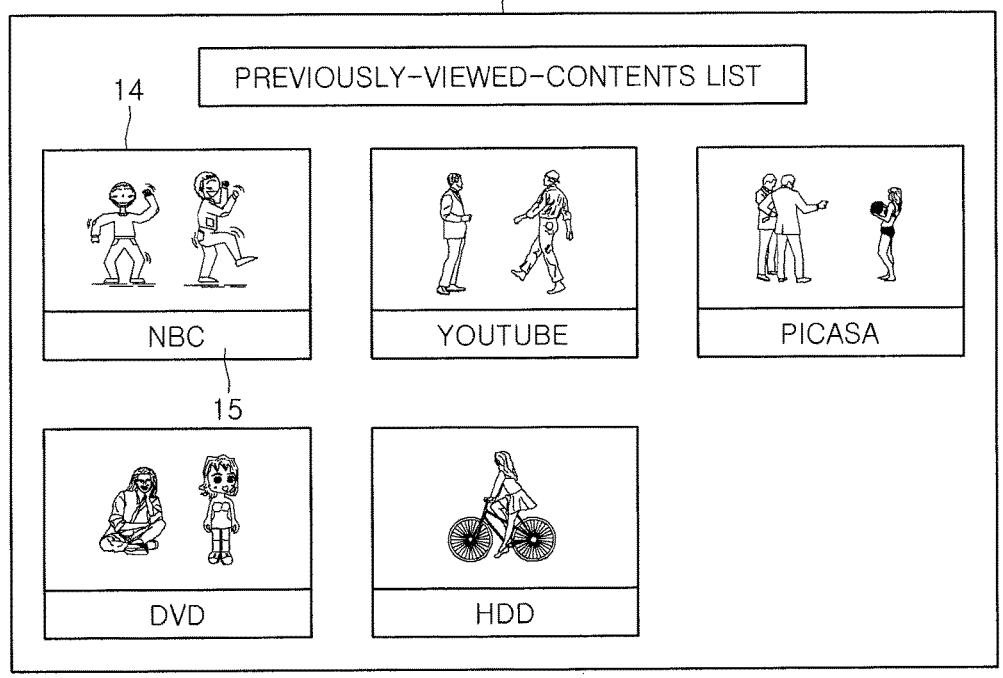
FIG. 2 is a view illustrating a list of contents previously viewed in a display device through a thumbnail according to an embodiment.

According to an embodiment, the previously-viewed-contents list may be displayed with thumbnails of contents. Referring to FIG. 2, a previously-viewed-contents list may include a thumbnail image 14 and a contents source 15, which are extracted from previously-viewed-contents. Moreover, according to an embodiment, contents information, i.e. above mentioned channel number or contents title, may be included in the previously-viewed-contents list.

Furthermore, according to an embodiment, an additional previously-viewed-contents list may be generated according to a user of the display device 10 and provided. When a function for setting a user through user login or a function for identifying a user through a camera is provided to the display device 10, previously-viewed-contents for each corresponding user may be stored, and then a previously-viewed-contents list that the corresponding user viewed may be provided.

Furthermore, according to an embodiment, after user information of the display device 10 is checked, contents inappropriate to a user may be displayed with a blank or may be omitted and not be displayed. At this point, user information may be inputted through a user login function or a camera in the same manner.

Figure 4:
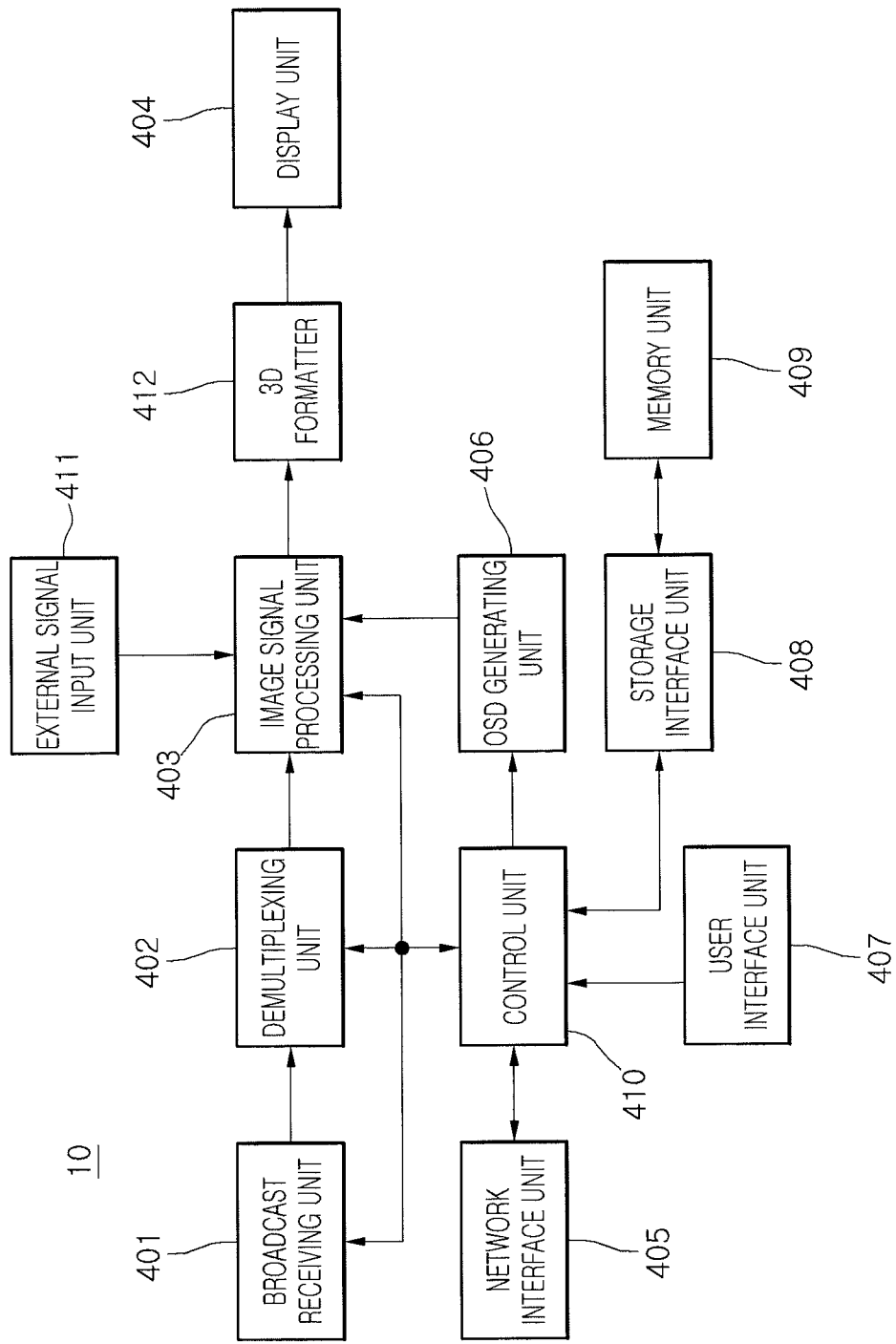
FIG. 4 is a block diagram illustrating a configuration of a display device according to an embodiment.

Hereinafter, a configuration and specific operations of the display device 10 for performing the above functions will be described. FIG. 4 is a block diagram illustrating a configuration of a display device 10 according to an embodiment.

The display device 10 may display real-time broadcasting contents received from a tuner through a wireless or cable, may display contents received through a network such as internet, may display contents stored in a storage media connected to or built in the display device 10, or may display contents received from an external device connected to the display device 10.

As shown in FIG. 4, the display device 10 for performing the above functions may include a broadcast receiving unit 401, a demultiplexing unit 402, an image signal processing unit 403, a display unit 404, a network interface unit 405, an OSD generating unit 406, a user interface unit 407, a storage interface unit 408, a storage device 409, an external signal input unit 411, a 3D formatter 412, and a control unit 410.

Among the above components, the broadcast receiving unit 401, the demultiplexing unit 402, and the image signal processing unit 403 may constitute one broadcast processing unit that receives a broadcast signal and process it in order to display the signal having an output format on the display unit 404.

In the case of digital broadcasting, a digital broadcast signal time-division multiplexes a video signal, an audio signal, and additional data in order to transmit them in a packetized transport stream format.

The broadcast receiving unit 401 includes an antenna for receiving a broadcast signal transmitted from an external, a tuner for tuning a broadcast signal having a frequency band corresponding to a tuning control signal of the control unit 410 described later, and a demodulator (i.e. demodulation unit) for performing Vestigial Sideband (VSB) demodulation and error correction processes on a broadcast signal of a tuned specific channel in order to output it in a transport stream format.

Additionally, the broadcast signal received through the broadcast receiving unit 401 may be separated by the demultiplexing unit 402 into various additional data defined as a video signal, an audio signal, and Program and System Information Protocol (PSIP) information, and then may be outputted in a bit stream format.

The video data separated by the demultiplexing unit 402 may be processed by the image signal processing unit 403, and then may be displayed on the display unit 404.

Moreover, the image signal processing unit 403 may include an MPEG-2 decoder, and a scaler for converting video data to be fit for a vertical frequency, a resolution, and an aspect ratio, which are output standard of the display unit 404.

The demultiplexing unit 402 and the image signal processing unit 403 may be called a contents processing unit as a component for converting contents to be fit for an output format.

The display unit 404 may display an image through various kinds of display panels such as Digital Light Processing (DLP), Liquid Crystal Display (LCD), and Plasma Display Panel (PDP).

An audio signal is processed by an audio signal processing unit (not shown) and then is outputted to a speaker. The audio signal processing unit may include an AC-3 decoder.

Moreover, additional data included in additional data separated by the demultiplexing unit 402 may be stored in the storage device 409 through the storage interface unit 408 described later.

The storage device 409 may be implemented by electrically erasable programmable read-only memory (EE-PROM).

The user interface unit 407 includes an infrared receiving unit for receiving an infrared signal inputted through a remote controller and a local key input unit disposed at one side of a panel, as a means for receiving a request command from a user The network interface unit 405 may receive contents or data from the contents provider 22 or the network administrator 21 through a network. That is, the network interface unit 405 may receive contents such as broadcasts, games, VODs, and broadcast signals and information related thereto, which are provided from contents providers through a network. Additionally, update information on firmware and update files provided from the network administrator 21 may be received through the network interface unit 405.

The OSD generating unit 406 may generate a menu screen to receive a determination signal of a user in an On Screen Display (OSD) format.

That is, the OSD generating unit 406 may display information on contents, which are received through the network interface unit 405, on a display unit.

The external signal input unit 411, as an interface for receiving input from another playing device such as a DVD player and a game console, may allow another playing device to access the external signal input unit 411, and then, may output multimedia stored in the other playing device to the display unit 404.

The control unit 410 may control overall operations according to a command inputted from the user interface unit 407. The control unit 410 determines whether contents are displayed over a predetermined time. If the contents are displayed over the predetermined time, the control unit 410 extracts information on corresponding contents, and then, stores it as data of a previously-viewed-contents list. The previously-viewed-contents list may be stored in the storage device 409.

In more detail, when the display device 10 receives and displays real-time broadcast, the control unit 410 stores information on a corresponding channel as data of a previously-viewed-contents list in the storage device 409 when a predetermined time (for example, 1 min) elapses after the real-time broadcast is fixed at one channel.

Additionally, when the display device 10 receives contents from a contents provider via a network and displays them, the control unit 410 may store contents provider information or URL access information of corresponding contents, if they are received over a predetermined time and then displayed.

Additionally, when the display device 10 plays the contents stored in a storage medium (for example, the storage device 409) connected to the display device 10, and displays them, the control unit 410 may store a storage path of the contents, i.e. an access path, if corresponding contents are played over a predetermined time.

Additionally, when the display device 10 receives contents from an external device through the external signal input unit 411 and displays them, the control unit 410 may store access information on the contents (i.e. external device information and path information of the contents in the external device), if the contents are played over a predetermined time.

Additionally, according to an embodiment, if a previously-viewed-contents list is provided in the thumbnail format of FIG. 2, the control unit 410 may extract thumbnail images of the played contents and then store them in addition to the access information on corresponding contents, if the contents are played over a predetermined time. The thumbnail image may be a picture I of a played interval. When contents are provided from a contents provider through a network, the contents provider may transmit the contents and the thumbnail image. The control unit 410 may generate a previously-viewed-contents list by using the transmitted thumbnail image.

According to an embodiment, the broadcast receiving device 40 may output a 3D image. The menu screen of the broadcast receiving device 40 may be provided in 3D. When contents that the contents provider 22 provides are in 3D, they may be received and outputted. Moreover, in order to output a 3D image, an additional component may be required.

That is, a display device may include the 3D formatter 412 at an output terminal of the image signal processing unit 408. The 3D formatter 412 converts an image processed by the image signal processing unit 408 into a 3D image, and then delivers the 3D image to the display unit 404. According to an embodiment, an additional 3D formatter for converting an OSD output into 3D may be included in the OSD generating unit 406.

The configuration shown in FIG. 4 is just one embodiment, and various known techniques may be used for processing a 3D image.

Additionally, when a previously-viewed-contents list is provided as a thumbnail image as shown in FIG. 2, the thumbnail image may be a 3D image.

Figure 5:
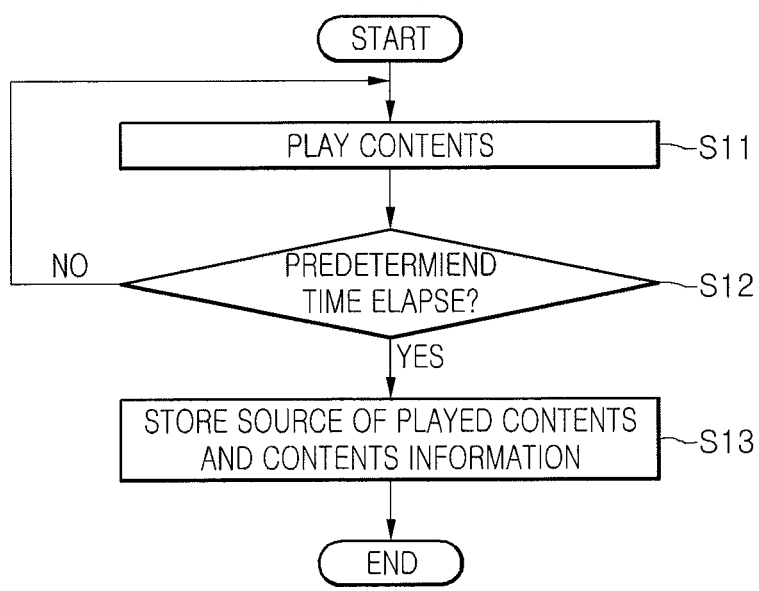
FIG. 5 is a flowchart illustrating a method of storing information on contents viewed in a display device according to an embodiment.

FIG. 5 is a flowchart illustrating a method of storing information on contents viewed in a display device according to an embodiment.

In operation S11, the display device 10 plays contents.

In operation S12, it is determined whether a predetermined time (for example, 1 min) elapses. If the predetermined time elapses, information on played contents, for example, contents source information and contents information, is stored in operation S13. As mentioned above, the source information may include contents provided through real time broadcasting, contents provided through a network, contents stored in a storage medium, and contents received from an external device. The contents information may include a title of the contents and access information. Additionally, according to an embodiment, a thumbnail image of the contents may be stored.

Figure 6:
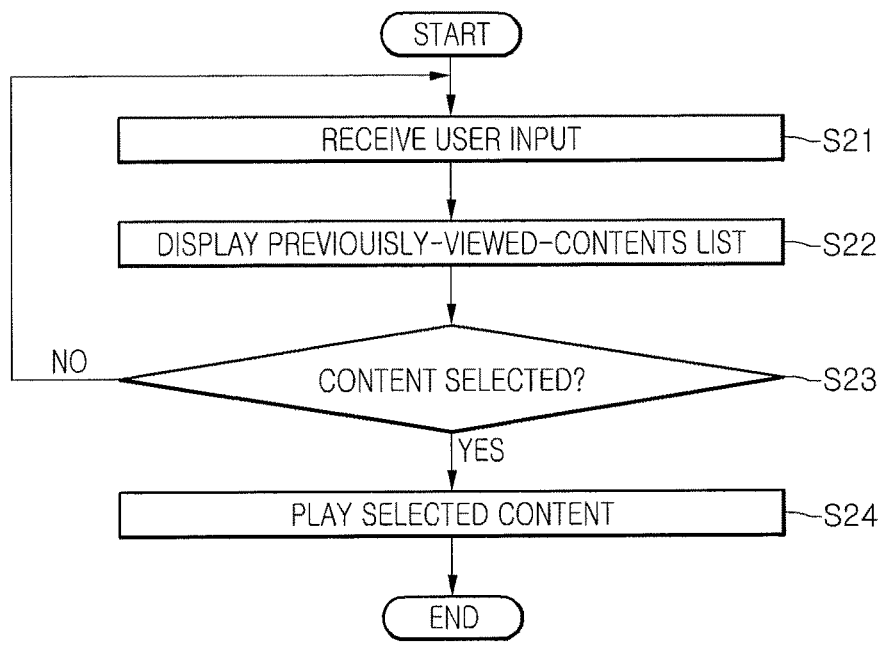
FIG. 6 is a flowchart illustrating a method of providing a previously viewed contents list stored in a display device according to an embodiment.

FIG. 6 is a flowchart illustrating a method of providing a previously-viewed-contents list stored in a display device according to an embodiment.

In operation S21, when a user input for displaying a previously-viewed-contents list is received, in response to that, a stored previously-viewed-contents list is displayed in operation S22.

When a user selects one content from the displayed previously-viewed-contents list in operation S23, the selected content is played in operation S24. For example, if the selected content is a real-time broadcast, a corresponding channel is tuned and the selected content is displayed. If the selected content is provided through a network, it is received by accessing a corresponding contents provider server. If the selected content is stored in a storage media, it is played by accessing a corresponding storage media. If the selected content is received from an external device, a corresponding content is played by accessing an external device.

Figure 7:
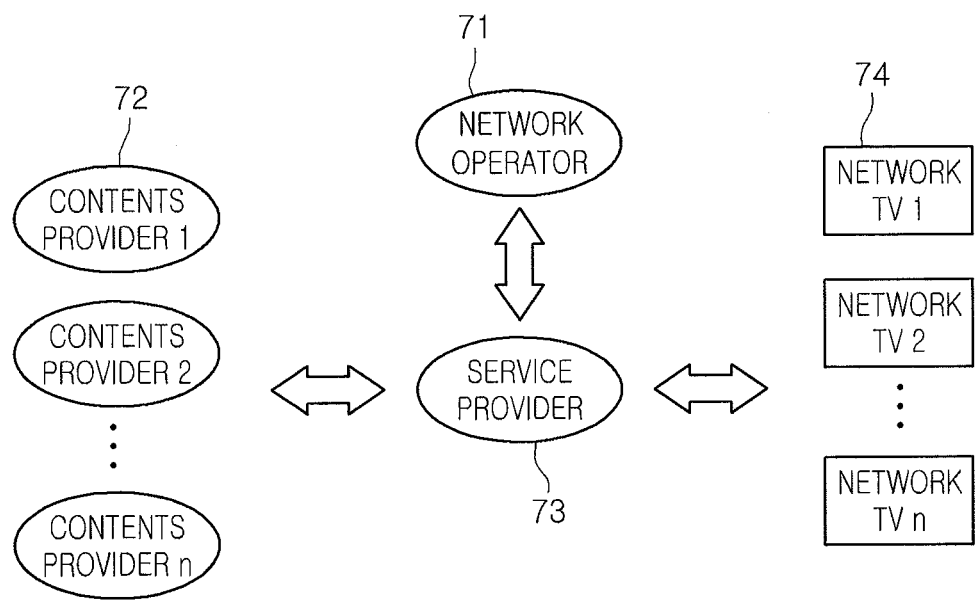
FIG. 7 is a network configuration diagram illustrating a network system providing contents via a network according to an embodiment.

FIG. 7 is a network configuration diagram illustrating a network system providing contents via a network according to an embodiment.

Referring to FIG. 7, the network system may include a network operator 71, at least one CP 72, and at least one display device 10. They may be connected to each other via a network, for example, internet.

The network operator 71 may provide base software necessary for allowing contents that a CP 72 provides to the display device 10 to operate normally therein or software necessary for an operation of the display device 10. Additionally, hardware information on the display device 10 necessary for normally executing contents therein may be provided to the CP 72.

For example, the network operator 71 may provide a user interface for providing a necessary basic screen frame, selecting contents or inputting various commands through a user, and displaying an output accordingly thereto when contents that CPs provide are provided to the display device 10. Additionally, the network operator 71 may provide data for updating the firmware or software of the display device 10. The network operator 71 and the display device 10 may be manufactured by the same manufacturer.

The CP 72 generates various contents that may be provided from a network, and converts the generated contents into a playable format of the display device 10, so that the contents may be provided at a request of the display device 10. Contents according to the present invention may be arbitrary multimedia contents that may be serviced via a network.

For example, the contents that the CP 72 provides may be directly provided from the CP 72 to the display device 10 via internet, or may be provided to the display device through the network operator 71.

The display device 10 receives contents from the CP 72 in order to play or execute them. For this, the display device 10 may include a broadcast receiving device such as a TV and a settop box equipped with a network module, and an arbitrary display device equipped with a network module such as a network phone. For this, as described with reference to FIG. 4, the display device 10 may include the network interface unit 405.

In more detail, the CP 72 may be a business operator, which creates various contents to be provided to the display device 10 or distributes them. The CP 72 may include a TV broadcasting station, a radio broadcasting station, a VOD business operator, an AOD business operator, a game business operator, a video call SP, a national information provider, and a photo related SP.

A TV broadcasting station refers to a typical terrestrial wave or cable broadcasting station. Such a broadcasting station creates and stores a program that users can watch, and converts the program into digital in order for transmission.

A radio broadcasting station may provide audio contents with/without video contents.

A VOD business operator and AOD business operator have different features than a TV or radio broadcasting station. That is, in the case of VOD or AOD, service is provided in order to store preferred broadcast programs, movies, or music and then play them. For example, if there is a broadcast program that a user cannot view due to the lack of time, the user may access a site for providing broadcast service, and then, may download a corresponding file or play it immediately.

An AOD business operator may provide a streaming service of audio contents.

A Music On Demand (MOD) SP allows a user to download and listen to preferred music.

A video call business operator may provide a relay service that allows a video call of a user in another network TV via a network. A national information provider provides national information on several regions, and a photo related SP provides a tool for editing and storing photos.

The display device 10 basically includes a network interface for accessing a network, receives and processes data packets via a network after an allocated IP address is received, and stores or plays data packets when the data packets are multimedia data such as video and audio.

The display device 10 operates in order to transmit a request item of a user to the CP 72 in two-way directions while processing multimedia data.

Figure 8:
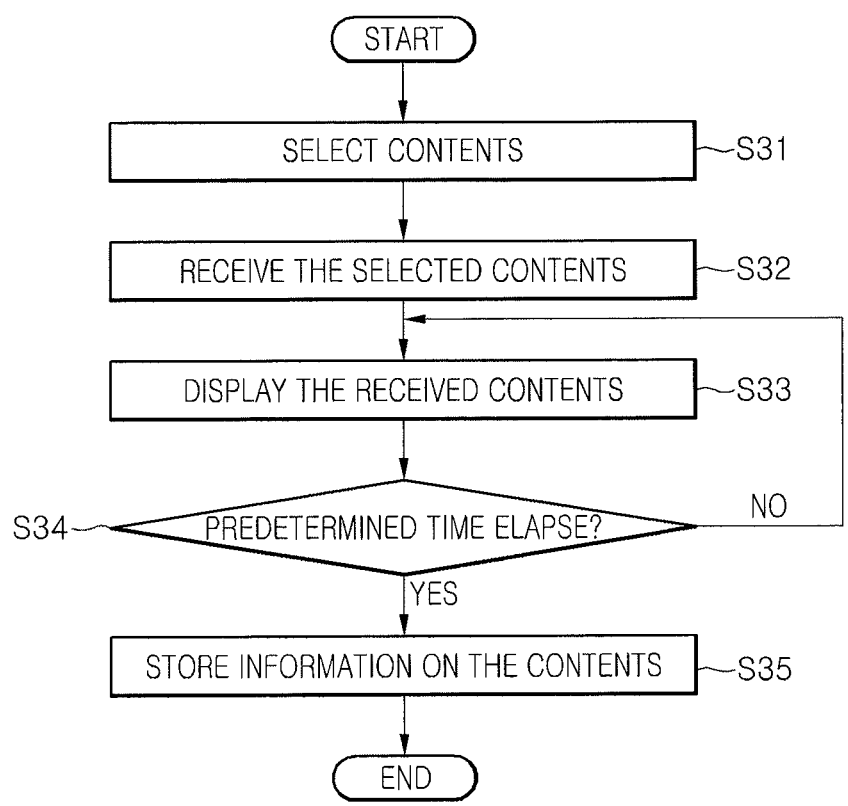
FIG. 8 is a flowchart illustrating a method of providing viewed contents information when contents that a user viewed are provided via the network of FIG. 7 according to an embodiment.

FIG. 8 is a flowchart illustrating a method of providing viewed contents information when contents that a user viewed are provided via the network of FIG. 7 according to an embodiment.

Referring to FIG. 8, according to a user's input, the display device 10 accesses a CP server and selects one of contents that the CP provides in operation S31.

Figure 10:
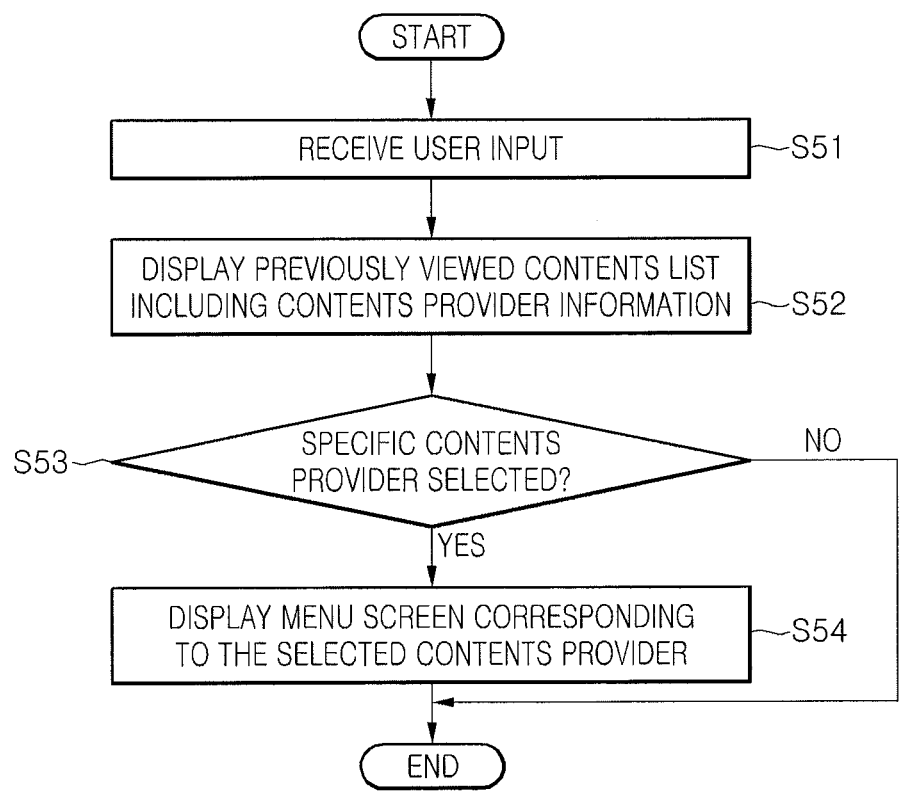
FIG. 10 is a flowchart illustrating a method of accessing contents through a previously viewed contents list when contents that a user viewed are provided via the network of FIG. 7 according to an embodiment.

When a user accesses a CP, for example, a CP server such as PICASA, the initial screen 31 of PICASA is displayed as shown in FIG. 10. Then, the user may select one of a plurality of icons 33 from the initial screen.

In operation S32, the display device 10 receives the selected contents from the CP.

A request signal of an item corresponding to the selected contents is transmitted to the CP that provides the selected contents, and corresponding contents transmitted from the CP is received in response to the request signal.

In operation S33, the display device 10 displays the received contents on the screen.

In operation S34, the display device 10 continuously checks an elapsed time from the timing at which the contents are displayed, and accordingly, determines whether the checked elapsed time exceeds a predetermined reference time.

That is, the display device 10 determines whether the user views the received contents more than the reference time. At this point, the reference time may be set to 1 min, 5 min, 10 min, or 1 hr by a user.

In operation S35, the display device 10 stores information on the contents when the elapsed time exceeds the reference time.

Here, the stored information may include information on a CP providing the contents and position information on the displayed contents item.

At this point, the position information on the contents item may be Uniform Resource Locator (URL) information used for receiving the contents.

The stored information is used for providing a previously viewed contents list later. Additionally, the stored information may be deleted by predetermined conditions. That is, when the stored information is more than a predetermined number, the first stored information may be deleted preferentially. Additionally, when the stored information elapses more than a predetermined time, the time elapsed information may be deleted preferentially.

Figure 9:
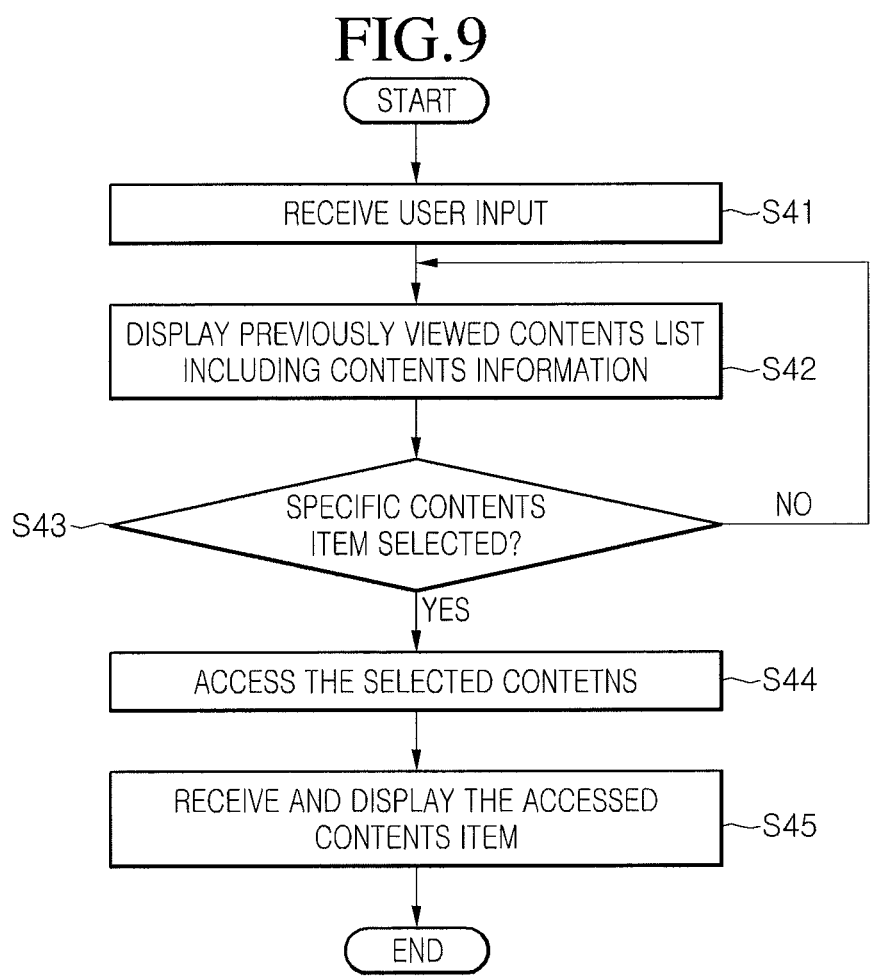
FIG. 9 is a flowchart illustrating a method of directly accessing contents when contents that a user viewed are provided via the network of FIG. 7 according to an embodiment.

FIG. 9 is a flowchart illustrating a method of directly accessing contents when contents that a user viewed are provided via the network of FIG. 7 according to an embodiment.

In operation S41, a user input is received in order to display a previously viewed contents list.

In operation S42, the previously viewed contents list including contents information is displayed.

In operation S43, it is determined whether specific contents are selected from the previously viewed contents list.

In operation S44, a CP server of the selected contents is accessed.

In operation S45, contents provided from the CP server are accessed in order to receive and play the contents.

FIG. 10 is a flowchart illustrating a method of accessing contents through a previously viewed contents list when contents that a user viewed are provided via the network of FIG. 7 according to an embodiment.

In operation S51, a user input is received in order to display a previously viewed contents list.

In operation S52, the previously viewed contents list including contents information is displayed.

In operation S53, it is determined whether specific contents are selected from the previously viewed contents list.

In operation S54, a CP server of the selected contents is accessed.

In operation S55, the initial screen, i.e. a menu screen, of the CP server is displayed. At this point, the menu screen may be the screen of FIG. 11.

Figure 11:
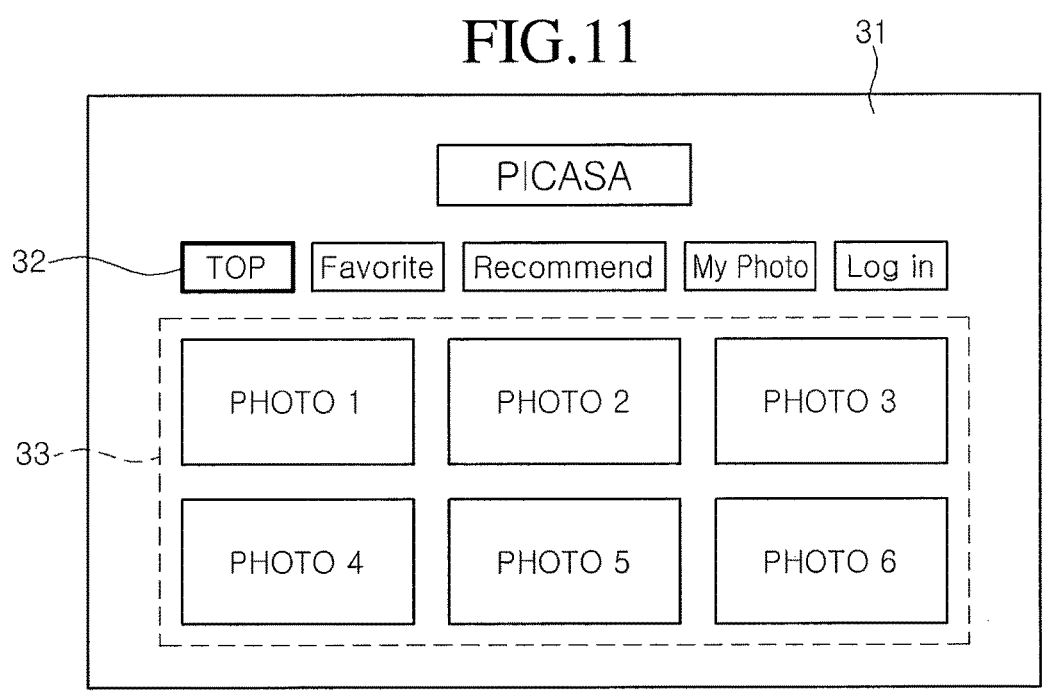
FIG. 11 is an initial menu screen provided from a CP according to an embodiment.

That is, referring to FIG. 11, when a specific CP is selected by the user, the display device 10 accesses the main screen of the selected CP server, i.e. the initially provided menu screen 31. The initially provided menu screen 31 includes various list items, and among them, a 'TOP' item 32 for notifying that the menu screen 31 is the initially provided main screen is selected. Then, a plurality of contents items 33 corresponding to the selected item 310 may be displayed on the menu screen 31.

Accordingly, a user may use CP information provided from the previously viewed contents list in order to easily access the main screen of a specific CP server that the user wants.

According to an embodiment, when one of contents included in the previously viewed contents list is selected, a playback screen for playing the contents may be displayed.

Additionally, according to an embodiment, the previously viewed contents list may be designated as a default screen that is immediately displayed when a display is turned on.

A user may easily recognize CP information on contents that the user recently uses by using the provided recently viewed contents list 310, and may easily access the recently viewed contents by using the CP information.

Figure 12:
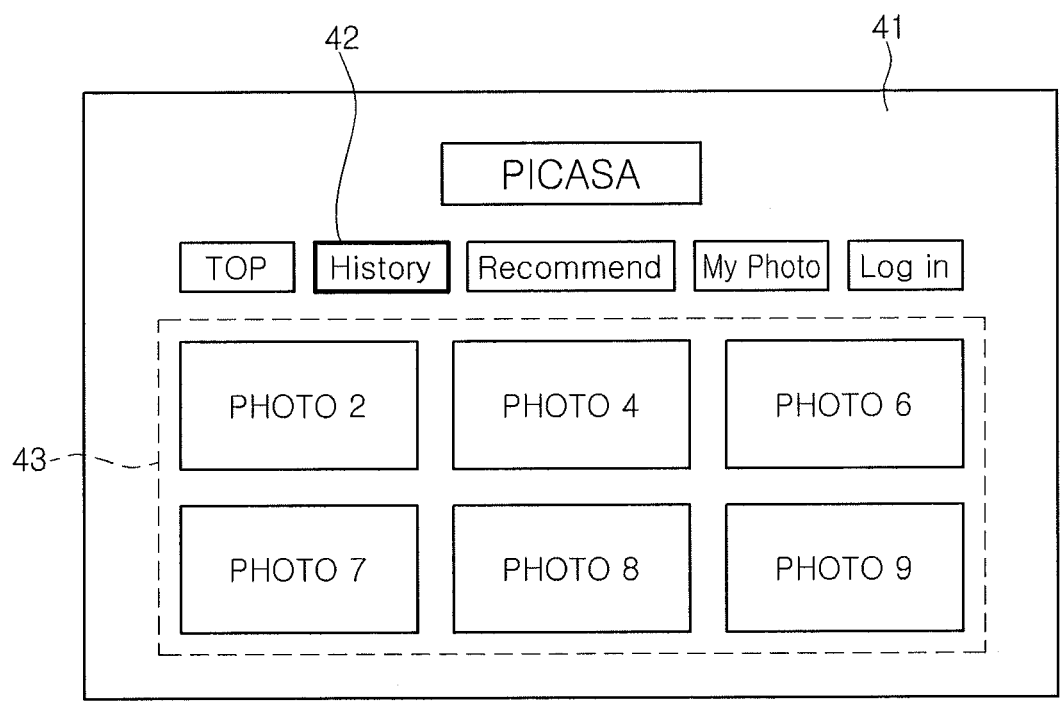
FIG. 12 is a screen illustrating a list of contents that a user previously viewed, which is provided from a CP server according to an embodiment.

Additionally, according to an embodiment, when a specific CP is selected from the previously viewed contents list, as shown in FIG. 12, a viewed contents history screen 41 for contents items that the user viewed previously among the contents items provided from the selected CP server may be displayed.

The provided viewed contents history screen 41 includes various list items. Among them, a 'History' item 610 notifying that the provided screen 41 is a list for previously viewed contents items is selected. Then, among the contents items provided from the CP, contents items 43 that a user previously viewed may be displayed on the viewed contents history screen 41. The contents item may include the title of contents and an image or thumbnail image thereof.

Accordingly, a user may use CP information provided from the previously viewed contents list in order to easily confirm contents items that the user viewed previously among contents items provided from a specific CP server.

Figure 13:
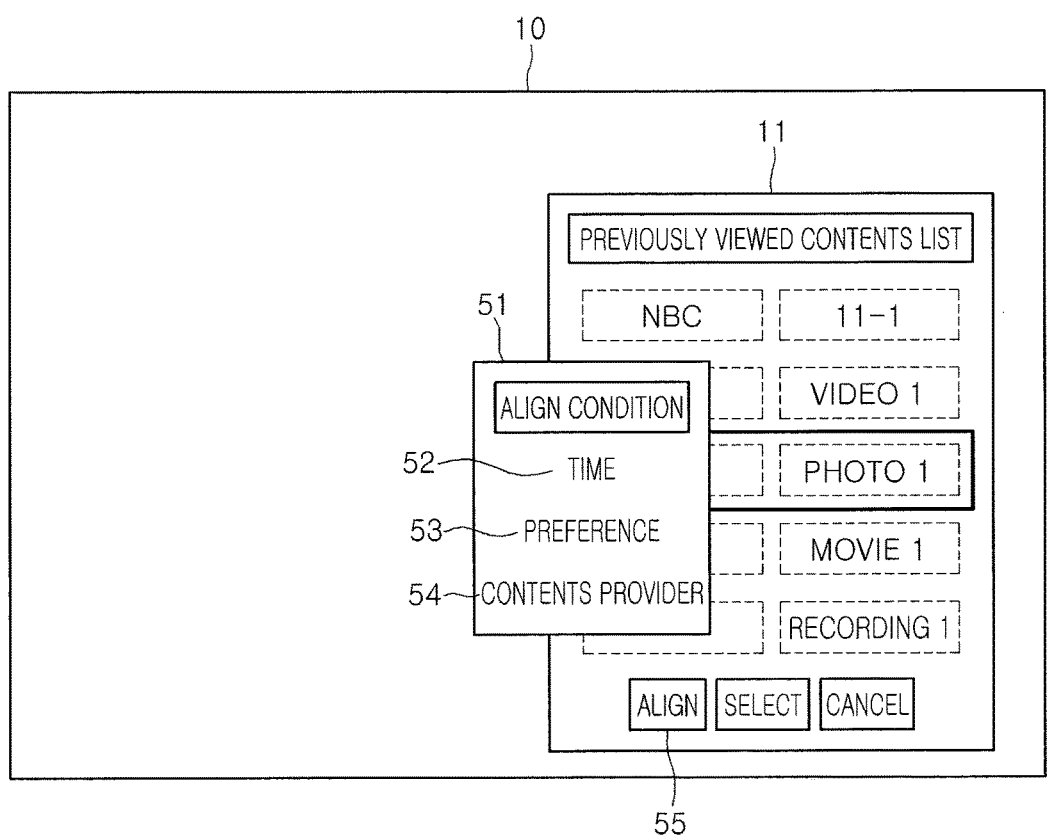
FIG. 13 is a view illustrating editing of a previously viewed contents list according to an embodiment.

Moreover, according to an embodiment, a previously viewed contents list may be edited as a user wishes. FIG. 13 is a view when a previously viewed contents list is edited according to an embodiment.

A plurality of execution menus are at the bottom of the previously viewed contents list 11. The execution menu includes an arrange menu 55, a select menu, and a cancel menu. Among them, the align menu 55 is a menu for aligning a plurality of contents items, displayed on the previously viewed contents list 11, according to a specific condition.

That is, when a user selects the align menu 55, as shown in FIG. 13, an additional align condition selection screen 51 is displayed in order to select an align condition as shown in FIG. 13. The align condition selection screen 51 may include a time condition 52, a preference condition 53, and a CP condition 54.

The time condition 52 is a condition for aligning the plurality of contents items in time order. That is, when the time condition 52 is selected, the plurality of contents items are aligned in the recently viewed contents item order and displayed. Additionally, on the contrary, the most recently viewed contents item may be displayed on the lowest bottom.

The preference condition 53 is a condition for aligning the plurality of contents items in preference order. That is, when the preference condition 53 is selected, the plurality of contents items are aligned in user's preference order and displayed. At this point, the preference may be determined by the displayed time of each contents item.

The CP condition 54 is a condition for aligning the plurality of contents items in CP order. That is, when the CP condition 54 is selected, the plurality of contents items are grouped by each contents item having the same CP and displayed.

Moreover, according to an embodiment, a user may select at least one specific CP from a plurality of CPs in a previously viewed contents list. Accordingly, only a contents item for the selected specific CP may be displayed in the previously viewed contents list. For example, as shown in FIG. 13, when a user selects the CP condition 54 as an align condition, as shown in FIG. 14, a previously viewed contents list including only the contents of a specific CP may be displayed.

Figure 14:
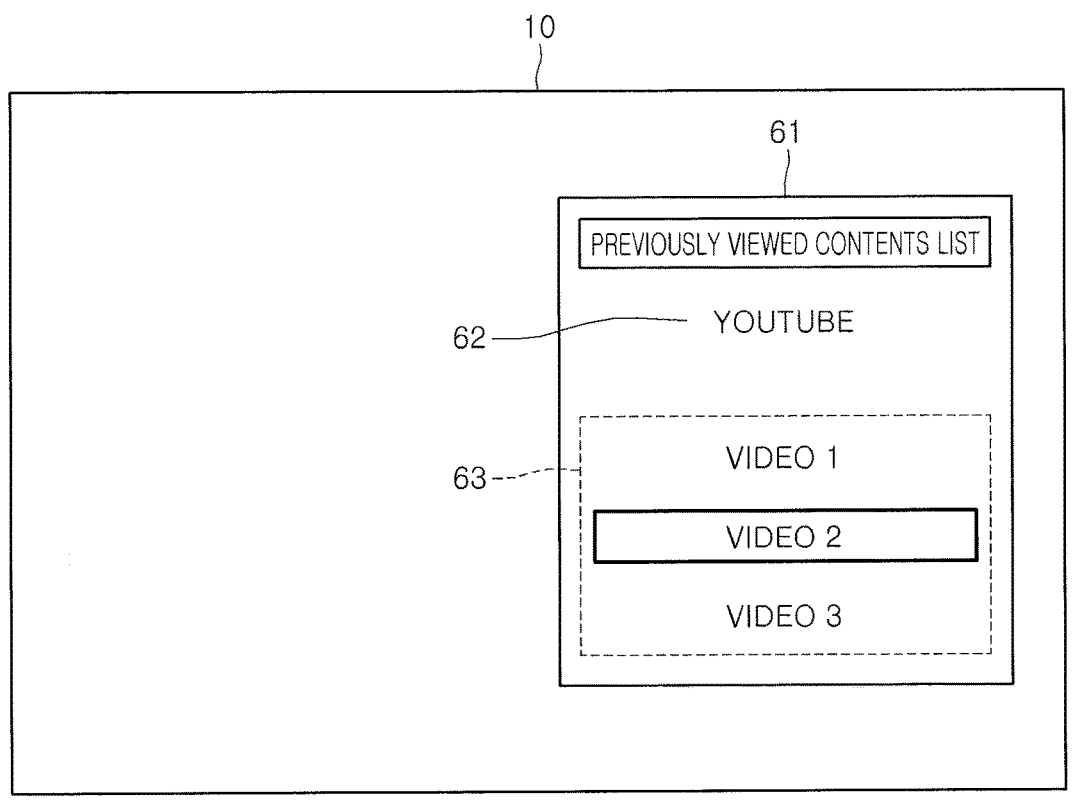
FIG. 14 is a view illustrating a previously viewed contents list aligned by a CP according to an embodiment.

Referring to FIG. 14, when the selected CP is 'YOUTUBE', information 62 on the selected CP and information on contents items that a user viewed recently among the contents items provided from the CP may be displayed in the previously viewed contents list 61.

As shown in FIG. 14, when a user selects one content, for example, a video 2, the display device 10 may access and display a corresponding video 2.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device, comprising:
    a memory;
    a receiving unit configured to receive a broadcasting signal including a broadcasting program;
    an external signal input unit configured to receive a content image from an external device connected to the display device;
    an interface unit configured to receive a request; and
    a control unit configured to:
    output a plurality of items, wherein the plurality of items include a first item including information identifying a content provider which has been previously accessed and providing a content through a network, a second item including information identifying the broadcasting program which has been previously output for more than a predetermined time and a third item including an access path for identifying the external signal input unit receiving the content image provided from the external device connected to the device, receive a first request for outputting a menu, in an On Screen Display (OSD) format, which is used for aligning the plurality of items, output the menu according to the received first request, wherein the menu includes a preference option for aligning the plurality of items in a preference order, receive a second request for selecting the preference option included in the menu, and realign the plurality of items in the preference order according to the received second request, wherein the preference order of the plurality of items is determined by a displayed time of each content corresponding to each of the plurality of items, and wherein the control unit is further configured to:
store, in the memory, a thumbnail extracted from the content image if the content image is output for more than the predetermined time, and store the access path of the content image, and output the thumbnail with the access path on the third item.

2. The device of claim 1, wherein when the first item is selected,
the control unit outputs contents history including contents previously output among contents provided from the content provider.

3. The device of claim 1, wherein the menu further includes a time option for aligning the plurality of items in a time order, and
the control unit aligns the plurality of items in an order of an item that has been recently output, executed or accessed when the time option included in the menu is selected.

4. The device of claim 1, wherein the menu further includes a content provider option for aligning the plurality of items in a content provider order, and
the plurality of items are grouped by each item having the same content provider when the content provider option included in the menu is selected.

5. The device of claim 1, wherein the control unit receives the first request and the second request from a remote controller or a local key.

6. The device of claim 1, wherein the memory is configured to store the information identifying the content provider, the information identifying the broadcasting program and the information identifying the external device or the access path.

7. The device of claim 1, wherein the control unit deletes a first stored item if the number of the plurality of items is more than a predetermined number.

8. The device of claim 1, wherein the information on identifying the content provider includes a name of the content provider, a thumbnail image of the content provided from the content provider, an URL access information corresponding to the content, or a title of the content.

9. The device of claim 1, wherein the information identifying the broadcasting program includes a name of a broadcasting station or a channel number of the broadcasting program.

10. The device of claim 1, wherein when one item among the plurality of items is stored for more than a predetermined time, the control unit deletes the one item.

11. The device of claim 1, wherein the control unit identifies a user of the display device by using a login or a camera and outputs the list corresponding to the identified user.

12. A method of controlling a device, the method comprising:
outputting a plurality of items, wherein the plurality of items include a first item including information identifying a content provider which has been previously accessed and providing a first content through a network, a second item including information identifying a broadcasting program which has been output for more than a predetermined time and a third item including an access path for identifying the external signal input unit receiving a content image provided from an external device connected to the device;

receiving a first request for outputting a menu, in an On Screen Display (OSD) format, which is used for aligning the plurality of items;

outputting the menu according to the received first request, wherein the menu includes a preference option for aligning the plurality of items in a preference order;

receiving a second request for selecting the preference option included in the menu; and realigning the plurality of items in the preference order according to the received second request, wherein the preference order of the plurality of items is determined by a displayed time of each content corresponding to each of the plurality of items, and wherein the method further comprises:
storing, in a memory, a thumbnail extracted from the content image if the content image is output for more than the predetermined time, and storing the access path of the content image; and outputting the thumbnail with the access path on the third item.

13. The method of claim 12, wherein the information identifying the content provider includes a name of the content provider, a thumbnail image of the content provided from the content provider, an URL access information of corresponding the content, or a title of the content.

14. The method of claim 12, wherein the information identifying the broadcasting program includes a name of a broadcasting station or a channel number of the broadcasting program.

15. The method of claim 12, further comprising deleting a first stored item when the number of the plurality of items is more than a predetermined number.

16. The method of claim 12, further comprising deleting one item among the plurality of items when the one item is stored for more than a predetermined time.

17. A display device, comprising:
a memory;
a display unit;
a receiving unit configured to receive a broadcasting signal including a broadcasting program;
an external signal input unit configured to receive a content image from an external device connected to the display device;
an interface unit configured to receive a request; and
a control unit configured to:
display a plurality of items on the display unit,
wherein the plurality of items include a first item including information identifying a content provider which has been previously accessed and providing a content through a network, a second item including information identifying the broadcasting program which has been previously displayed for more than a predetermined time and a third item including an access path for identifying the external signal input unit receiving the content image provided from the external device, receive a first request for displaying a menu, in an On Screen Display (OSD) format, which is used for aligning the displayed plurality of items, display the menu according to the received first request, wherein the menu includes a preference option for aligning the at least two items the plurality of items in a preference order, receive a second request for selecting the preference option included in the menu, and realign the plurality of items in the preference order according to the received second request, wherein the preference order of the plurality of items is determined by a displayed time of each content corresponding to each of the plurality of items, and wherein the control unit is further configured to:

store, in the memory, a thumbnail extracted from the content image if the content image is displayed for more than the predetermined time on the display unit, and store the access path of the content image, and display the thumbnail with the access path on the third item.

18. The device of claim 17, wherein the information identifying the content provider includes a name of the content provider, a thumbnail image of the content provided from the content provider, an URL access information of corresponding the content, or a title of the content.

19. The device of claim 17, wherein the information identifying the broadcasting program includes a name of a broadcasting station or a channel number of the broadcasting program.

20. The device of claim 17, wherein the menu further includes a time option for aligning the plurality of items in a time order, and wherein the control unit aligns the plurality of items in an order of an item that has been recently output, executed or accessed when the time option included in the menu is selected.

21. The device of claim 17, wherein the second item includes a thumbnail image corresponding to the broadcasting program which has been previously viewed.

* * * * *